US012706379B2

(12) United States Patent
Wang et al.

(10) Patent No.: US 12,706,379 B2
(45) Date of Patent: Aug. 11, 2026

(54) METASURFACE DEVICE, MANUFACTURING METHOD THEREOF, ANTENNA AND COMMUNICATION DEVICE

(71) Applicants: Beijing BOE Technology Development Co., Ltd., Beijing (CN); BOE Technology Group Co., Ltd., Beijing (CN)

(72) Inventors: Long Wang, Beijing (CN); Jian Zhou, Beijing (CN); Feng Wang, Beijing (CN); Yuehua Liu, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 293 days.

(21) Appl. No.: 18/580,193

(22) PCT Filed: Jul. 21, 2022

(86) PCT No.: PCT/CN2022/107011

§ 371 (c)(1),
(2) Date: Jan. 18, 2024

(87) PCT Pub. No.: WO2024/016258

PCT Pub. Date: Jan. 25, 2024

(65) Prior Publication Data

US 2025/0087880 A1 Mar. 13, 2025

(51) Int. Cl.

| | |
|---|---|
| ***H01Q 3/32*** | (2006.01) |
| ***H01Q 1/52*** | (2006.01) |
| ***H02N 1/00*** | (2006.01) |

(52) U.S. Cl.

CPC ............... *H01Q 3/32* (2013.01); *H01Q 1/526* (2013.01); *H02N 1/008* (2013.01)

(58) Field of Classification Search

CPC ........... H01Q 3/32; H01Q 1/526; H02N 1/008

USPC ........................................................ 342/372

See application file for complete search history.

(56) References Cited

U.S. PATENT DOCUMENTS

2023/0282984 A1* 9/2023 Cheah ................. H01Q 9/0407 343/702

FOREIGN PATENT DOCUMENTS

WO WO-2018007210 A1 * 1/2018 ........... H01Q 21/064

* cited by examiner

*Primary Examiner* — Harry K Liu

(74) *Attorney, Agent, or Firm* — HOUTTEMAN LAW LLC

(57) ABSTRACT

The present disclosure provides a metasurface device and a method for manufacturing a metasurface device, an antenna and a communication device. The metasurface device includes: a substrate; and a metal layer on the substrate and having a plurality of openings therein; and a plurality of phase control structures on a side of the metal layer away from the substrate, and in one-to-one correspondence with the plurality of openings; and each phase control structure includes a baffle and at least one micro-mechanical driver, the baffle is connected to the at least one micro-mechanical driver, which is configured to actuate the baffle to shield a corresponding opening in response to a received signal.

17 Claims, 15 Drawing Sheets

312

H

METASURFACE DEVICE, MANUFACTURING METHOD THEREOF, ANTENNA AND COMMUNICATION DEVICE

TECHNICAL FIELD

The present disclosure relates to the field of thin film communication technology, and in particular to a metasurface device, a method for manufacturing a metasurface device, an antenna and a communication device.

BACKGROUND

As the wireless communication technology is widely used, a microwave antenna, which is one of the essential components of the wireless communication technology, is receiving wide attention in the industry.

A planar antenna in the microwave antenna becomes a new development trend due to the characteristics of easy development and integration, high performance, low cost and the like.

The planar antenna includes an array antenna based on the phased array technology, and a holographic antenna based on the metasurface technology and the like. In the process of developing the holographic antenna based on the metasurface technology, in order to realize beam control, it is necessary for a metasurface unit to be integrated with a switch. For example, a liquid crystal device as the switch is integrated in the metasurface unit due to low cost, mature process and easy integration.

However, a response speed of liquid crystal is in the millisecond (ms) level, and there is a significant difference between performances of liquid crystal at high and low temperatures. Thus, if a faster response speed is required and the liquid crystal is used in a plurality of areas with different temperatures, it is necessary to develop other technologies.

SUMMARY

Embodiments of the present disclosure provide a metasurface device and a manufacturing method thereof, an antenna and a communication device, in order to solve the technical problems in the prior art.

In a first aspect, in order to solve the above technical problem, an embodiment of the present disclosure provides a metasurface device, including: a substrate; and a metal layer on the substrate and having a plurality of openings therein; and a plurality of phase control structures on a side of the metal layer away from the substrate, and in one-to-one correspondence with the plurality of openings; and wherein each phase control structure includes a baffle and at least one micro-mechanical driver, the baffle is connected to the corresponding micro-mechanical driver, each micro-mechanical driver is configured to actuate the baffle to shield the corresponding opening in response to a received signal.

In some embodiments, wherein each micro-mechanical driver includes: a stator fixed at one side of the corresponding opening; and a rotor opposite to the stator, wherein one end of the rotor is fit with the stator, and the other end of the rotor is connected to the corresponding baffle.

In some embodiments, each stator includes: stator comb teeth; and a stator electrode connected to the stator comb teeth.

In some embodiments, each rotor includes: rotor comb teeth opposite to the stator comb teeth, wherein the rotor comb teeth are in staggered fit with the stator comb teeth, and one end of each of the rotor comb teeth away from the stator comb teeth is connected to the baffle; a rotor electrode; and an elastic connection structure connected between the rotor comb teeth and the rotor electrode, wherein the rotor electrode and the stator electrode are configured to generate an electrostatic force between the stator comb teeth and the rotor comb teeth after signals are applied to the rotor electrode and the stator electrode, by which the rotor comb teeth are driven to drive the corresponding baffle to move toward the stator comb teeth.

In some embodiments, each elastic connection structure includes: a connection member connected between the rotor comb teeth and the corresponding baffle; and two sets of springs on two opposite sides of the connection member, wherein one end of each spring is connected to one side of the connection member, and the other end of each spring is connected to the rotor electrode.

In some embodiments, each elastic connection structure further includes: two spring anchor blocks on two sides of the two set of springs away from the connection member, respectively, wherein each spring anchor block is fixed at one end of the rotor electrode and directly connected to the other end of the corresponding spring.

In some embodiments, a thickness of each spring is at least 0.2 times a width of the spring.

In some embodiments, each spring includes: a straight-line spring, or a zigzag spring.

In some embodiments, the rotor electrode half surrounds the corresponding baffle, and the rotor comb teeth are on a side of the baffle not surrounded by the rotor electrode.

In some embodiments, each phase control structure includes two micro-mechanical drivers on two opposite sides of the corresponding baffle and connected to the baffle.

In some embodiments, the rotor electrode and the rotor comb teeth of each micro-mechanical driver are on the same side of the baffle.

In some embodiments, each baffle includes: a hollow-out groove; wherein when the baffle is located at an initial position, an orthographic projection of the hollow-out groove on the substrate completely covers an orthographic projection of the corresponding opening on the substrate; and a shielding structure capable of effectively shielding the corresponding opening, wherein the shielding structure and the hollow-out groove are arranged side by side in a moving direction of the baffle.

In some embodiments, the shielding structure includes: a hollow-out structure; wherein when the hollow-out structure shields the opening, an effective size of the shielded opening is smaller than a half wavelength of the microwave passing through the opening.

In some embodiments, the hollow-out structure includes: a comb-tooth structure, or a mesh structure.

In some embodiments, the comb-tooth structure includes: at least one comb tooth, wherein an extending direction of the at least one comb tooth is the same as the moving direction of the baffle or intersects with the moving direction of the baffle.

In some embodiments, an outer contour of the shielding structure is smaller than an outer contour of the corresponding opening.

In some embodiments, each opening includes a plurality of sub-openings arranged along the moving direction of the baffle.

In some embodiments, the hollow-out groove includes a plurality of hollow-out sub-grooves in one-to-one correspondence with the plurality of sub-openings; and the shielding structure includes a plurality of shielding sub-structures, and every two adjacent shielding sub-structures are on two opposite sides of one hollow-out sub-groove.

In some embodiments, a material for the phase control structure includes: a semiconductor material, or a metal material.

In some embodiments, the metasurface device further includes: an insulating layer between the metal layer and a layer where the plurality of phase control structures are located.

In some embodiments, a material of the insulating layer includes: at least one layer of inorganic material.

In some embodiments, the metasurface device further includes: a transition layer between the substrate and the metal layer, and for increasing adhesion of the metal layer.

In a second aspect, an embodiment of the present disclosure provides a method for manufacturing a metasurface device, including: providing a substrate; forming a metal layer having a plurality of openings therein on one side of the substrate; and forming a plurality of phase control structures on a side of the metal layer away from the substrate, wherein the phase control structures are in one-to-one correspondence with the openings; each phase control structure includes a baffle and at least one micro-mechanical driver, the baffle is connected to the micro-mechanical driver, and the driver drives the baffle to shield the corresponding opening according to a received shielding signal.

In some embodiments, the forming the metal layer having the plurality of openings therein on one side of the substrate includes: forming a transition layer on one side of the substrate; wherein the transition layer is used for increasing the adhesion of the metal layer; forming an original metal layer on a side of the transition layer away from the substrate by sputtering; and forming the plurality of openings in the original metal layer to obtain the metal layer with the plurality of openings.

In some embodiments, the forming the plurality of openings in the original metal layer to obtain the metal layer with the plurality of openings, includes: patterning the original metal layer to obtain the metal layer with the plurality of openings.

In some embodiments, the forming the plurality of openings in the original metal layer to obtain the metal layer with the plurality of openings, includes: patterning the original metal layer to form a seed layer with the plurality of openings; and electroplating and thickening the seed layer with the plurality of openings to obtain the metal layer with the plurality of openings.

In some embodiments, the method further includes, prior to forming the plurality of phase control structures on a side of the metal layer away from the substrate: forming an insulating layer on a side of the metal layer away from the substrate; and forming a sacrificial layer on one side of the insulating layer; wherein the sacrificial layer is used to suspend a portion of each phase control structure that is to move.

In some embodiments, the insulating layer and the sacrificial layer are made of different materials.

In some embodiments, the forming the plurality of phase control structures on a side of the metal layer away from the substrate, includes: forming a low-impedance conductive layer on a side of the sacrificial layer away from the substrate; patterning the conductive layer to form the micro-mechanical driver and the baffle of each phase control structure; wherein each micro-mechanical driver includes a stator fixed on one side of the corresponding opening and a rotor arranged opposite to the stator, one end of the rotor is fit with the stator, and the other end of the rotor is connected to the corresponding baffle; and removing the sacrificial layer to obtain the plurality of phase control structures.

In some embodiments, the method further includes, before the forming the sacrificial layer: forming a lead layer on a side of the insulating layer away from the substrate, wherein the lead layer includes a plurality of leads connected to the micro-mechanical drivers.

In a third aspect, an embodiment of the present disclosure provides an antenna, including: the metasurface device of the first aspect; and a feeding unit on one side of the metasurface device, for providing microwaves to the metasurface device.

In a fourth aspect, an embodiment of the present disclosure provides a communication device, including the antenna according to the third aspect.

Figure 1:
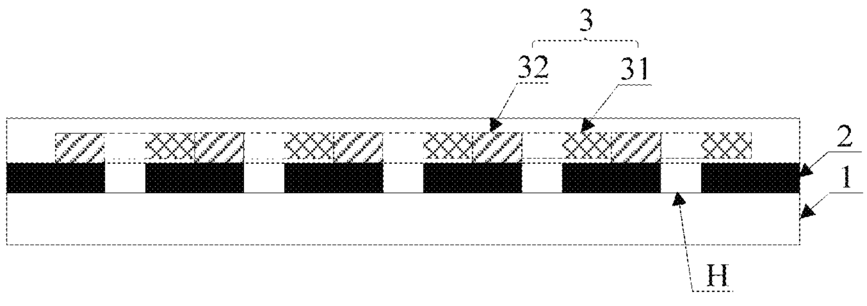
FIG. 1 is a schematic diagram of a structure of a metasurface device according to an embodiment of the present disclosure.

Reference numerals are as follows:

A substrate 1, a metal layer 2, an opening H, a phase control structure 3, a baffle 31, a micro-mechanical driver 32, a stator 321, a rotor 322, stator comb teeth 3211, a stator electrode 3212, rotor comb teeth 3221, a rotor electrode 3222, an elastic connection structure 3223, a connection member 32231, a spring 32232, a spring anchor block 32233, a hollow-out groove 311, a shielding structure 312, a sub-opening h, a hollowed-out sub-groove 311', a shielding sub-structure 312', an insulating layer 4, a protective layer 5, a transition layer 6.

DETAIL DESCRIPTION OF EMBODIMENTS

The embodiment of the present disclosure provides a metasurface device and a manufacturing method thereof, an antenna and a communication device, in order to solve the technical problems in the prior art.

In order to make the objects, features and advantages of the present disclosure more apparent and comprehensible, the present disclosure is further described in conjunction with the accompanying drawings and embodiments. Example embodiments may, however, be embodied in many different forms and should not be construed as limited to the embodiments set forth herein; rather, these embodiments are provided so that the present disclosure will be thorough and complete, and will fully convey the concept of example embodiments to one of ordinary skill in the art. The same reference numerals in the drawings denote the same or similar structures, and thus, a repetitive description thereof will be omitted. Words indicating positions and directions described in the present disclosure are illustrated by way of example in the accompanying drawings, but may be changed as required and are within the scope of the present disclosure. The drawings of the present disclosure only show the relative position relationship and do not represent true scale.

It should be noted that in the following description, specific details are set forth in order to provide a thorough understanding of the present disclosure. However, the present disclosure can be embodied in many different forms than those described herein and one of ordinary skill in the art can perform a similar promotion for the present disclosure without departing from the connotation of the present disclosure. Therefore, the present disclosure is not limited to the specific embodiments disclosed below. The following description is the preferred embodiment for embodying the present application, but is used for illustrating the general principles of the application and is not to be taken in a limiting sense. The scope of the present application is to be considered as defined by the appended claims.

A metasurface device, a manufacturing method thereof, a holographic antenna and a communication device provided by the embodiment of the present disclosure are specifically described below with reference to the accompanying drawings.

FIG. 1 is a schematic diagram of a structure of a metasurface device according to an embodiment of the present disclosure, referring to FIG. 1, the metasurface device includes:

A substrate 1, and a metal layer 2 laminated on the substrate 1, the metal layer 2 having a plurality of openings H through which microwaves pass.

The substrate 1 may be made of low loss glass, acrylic plastic, or a printed circuit board (PCB), or the like; the metal layer 2 may be made of a metal with good electrical conductivity, such as aluminum, copper, silver, gold, or the like; and a thickness of the metal layer 2 may be in a range of 0.2 μm to 20 μm. A size of each opening H is generally related to a wavelength of the microwaves to pass through the opening H.

The metasurface device includes: a plurality of phase control structures 3 on a side of the metal layer 2 away from the substrate 1, and in one-to-one correspondence with the plurality of openings H;

Each phase control structure 3 includes a baffle 31 and at least one micro-mechanical driver 32, the baffle 31 is connected to the micro-mechanical driver 32, the micro-mechanical driver 32 is configured to actuate the baffle 31 to shield the corresponding opening H in response to a received signal. The baffle 31 may be directly connected to the micro-mechanical driver 32, or may be indirectly connected to the micro-mechanical driver 32 through a connection member, which is not limited in particular.

In the embodiment provided by the present disclosure, the response speed of the micro-mechanical driver 32 may reach a sub-millisecond level, so that compared to the case in the related art in which the liquid crystal with the response speed in the ms level is used as a switch for shielding the opening H, the solution of the present disclosure in which the micro-mechanical driver 32 is used to drive the baffle 31 to shield the corresponding opening H has higher response speed. Meanwhile, the micro-mechanical driver 32 has low sensitivity to temperature, so that the micro-mechanical driver has a wider temperature application range than the liquid crystal greatly influenced by temperature, and the environmental adaptability of the metasurface device can be improved.

Figure 2:
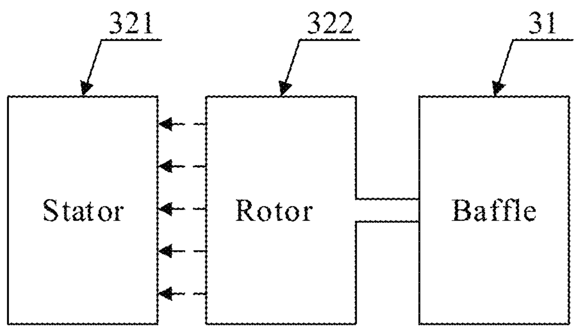
FIG. 2 is a schematic diagram of a structure of a micro-mechanical driver according to an embodiment of the present disclosure.

FIG. 2 is a schematic diagram of a structure of a micro-mechanical driver according to an embodiment of the present disclosure, referring to FIG. 2, each micro-mechanical driver 32 includes:

A stator 321 fixed at one side of the corresponding opening H;

A rotor 322 opposite to the stator 321, one end of the rotor 322 is fit with the stator 321, and the other end is connected to the corresponding baffle 31.

For example, the baffle 31 does not shield the corresponding opening H at an initial position, and a potential difference between the rotor 322 and the stator 321 is smaller than a set threshold; and after the micro-mechanical driver 32 receives a signal, the potential difference between the rotor 322 and the stator 321 is greater than the set threshold, and an electrostatic force of mutual attraction (an electrostatic force by which the rotor 322 and the stator 321 are attracted to each other) is generated between the rotor 322 and the stator 321, so that the rotor 322 drives the baffle 31 to move toward the stator 321, and the baffle 31 shields the corresponding opening H, and thus the microwave cannot be radiated through the opening H.

In the embodiment of the present disclosure, the micro-mechanical driver 32 includes the stator 321 fixed on a side of the corresponding opening H and the rotor 322 opposite to the stator 321, and one end of the rotor 322 is fit with the stator 321, and the other end of the rotor 322 is connected to the baffle 31, so that when the potential difference exists between the stator 321 and the rotor 322, the electrostatic force for driving the rotor 322 to move may be generated, and thus the rotor 322 is used to drive the baffle 31 to shield the corresponding opening H.

Figure 3:
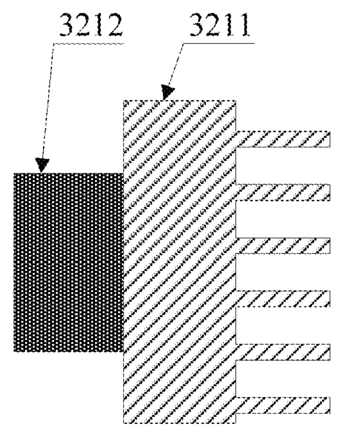
FIG. 3 is a schematic diagram of a structure of a stator according to an embodiment of the present disclosure.

FIG. 3 is a schematic diagram of a structure of a stator according to an embodiment of the present disclosure. Referring to FIG. 3, the stator 321 includes:

Stator comb teeth 3211;

A stator electrode 3212 connected to the stator comb teeth 3211.

The stator electrode 3212 is configured to provide a different electric potential to the stator comb teeth 3211 from that of the rotor 322, so that the stator comb teeth 3211 and the rotor 322 are fit with each other to generate an electrostatic force.

Figure 4:
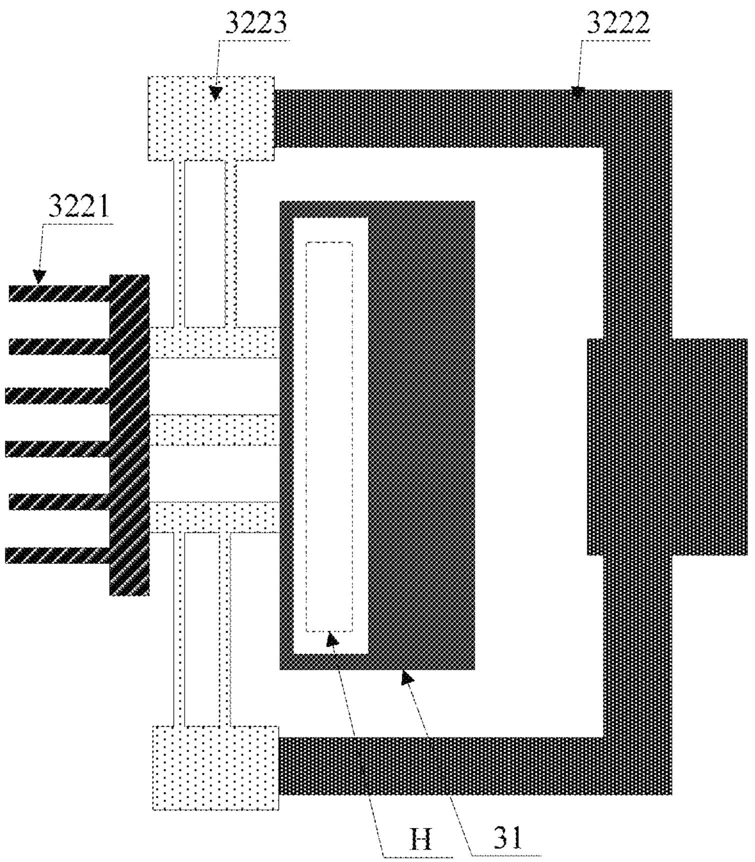
FIG. 4 is a schematic diagram of a structure of a rotor according to an embodiment of the present disclosure.
Figure 5:
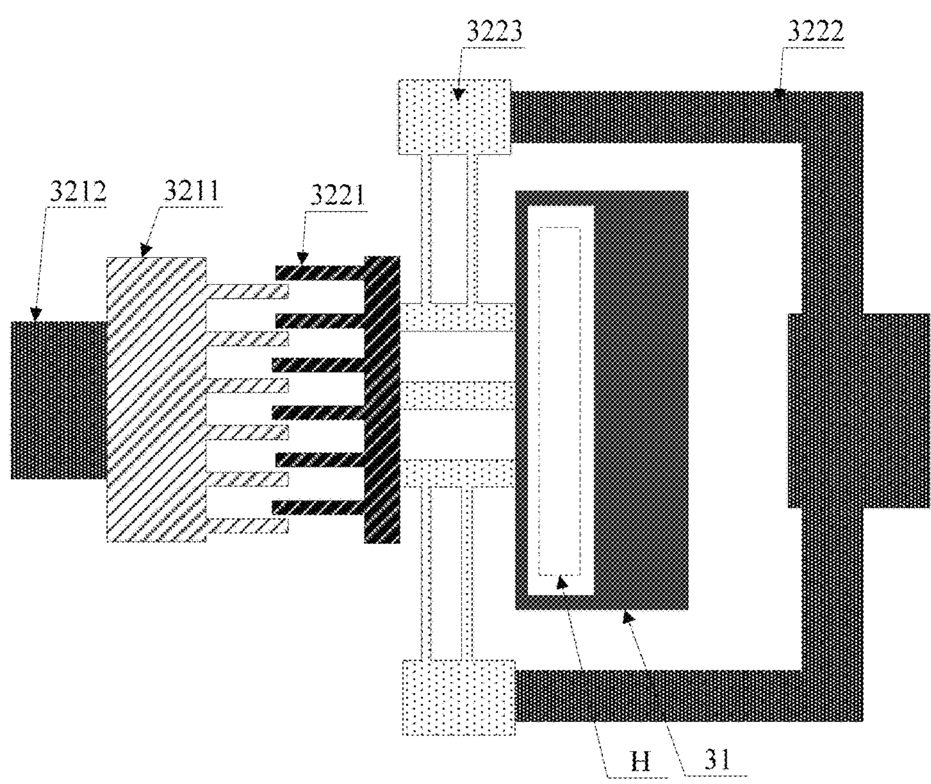
FIG. 5 is a schematic diagram of a state where a baffle is not driven by a micro-mechanical driver according to an embodiment of the present disclosure.

Referring to FIGS. 4 and 5, FIG. 4 is a schematic diagram of a structure of a rotor according to an embodiment of the present disclosure, and FIG. 5 is a schematic diagram of another state where a baffle is not driven by a micro-mechanical driver according to an embodiment of the present disclosure. The rotor 322 includes:

Rotor comb teeth 3221 opposite to the stator comb teeth 3211, the rotor comb teeth 3221 are in staggered fit with the stator comb teeth 3211, and one end of each of the rotor comb teeth 3221 away from the stator comb teeth 3211 is connected to the baffle 31;

A rotor electrode 3222;

In some embodiments, as shown in FIG. 5, the rotor electrode 3222 half surrounds the baffle 31, and the rotor comb teeth 3221 are located on a side of the baffle 31 not surrounded by the rotor electrode 3222.

Figure 6:
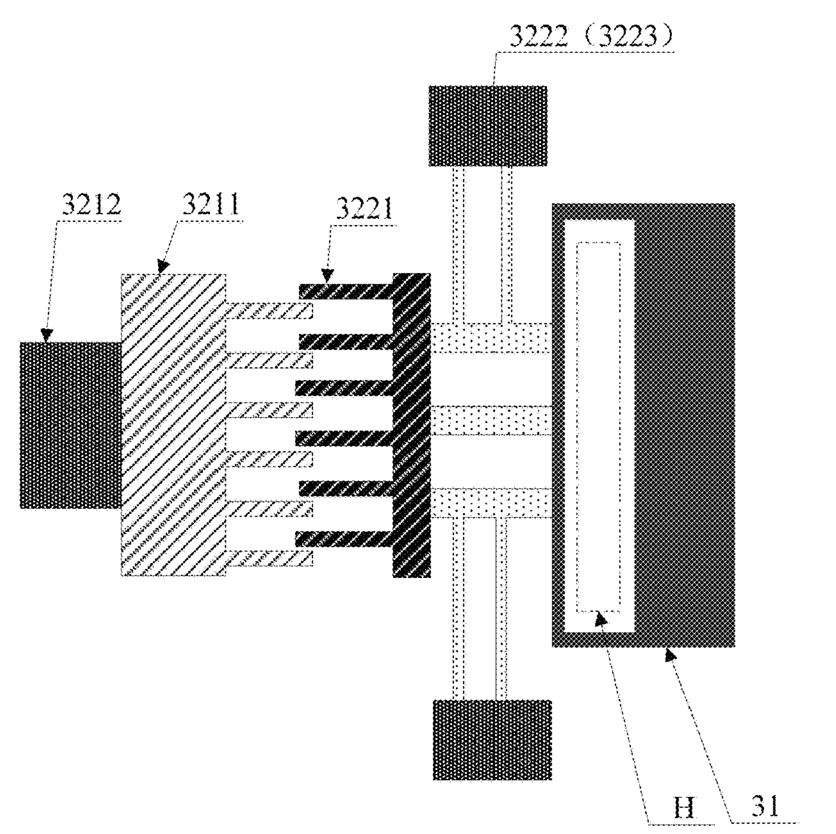
FIG. 6 is a schematic diagram of another structure of a micro-mechanical driver according to an embodiment of the present disclosure.

In other embodiments, as shown in FIG. 6, FIG. 6 is a schematic diagram of another structure of a micro-mechanical driver according to an embodiment of the present disclosure. Each rotor 322 may include two rotor electrodes 3222 respectively located on two opposite sides of an elastic connection structure 3223.

The elastic connection structure 3223 is connected between the rotor comb teeth 3221 and the rotor electrode 3222. The rotor electrode 3222 and the stator electrode 3212 are configured to generate an electrostatic force between the stator comb teeth 3211 and the rotor comb teeth 3221 after signals are applied to the rotor electrode 3222 and the stator electrode 3212, by which the rotor comb teeth 3221 are driven to drive the baffle 31 to move toward the stator comb teeth 3211.

Figure 7:
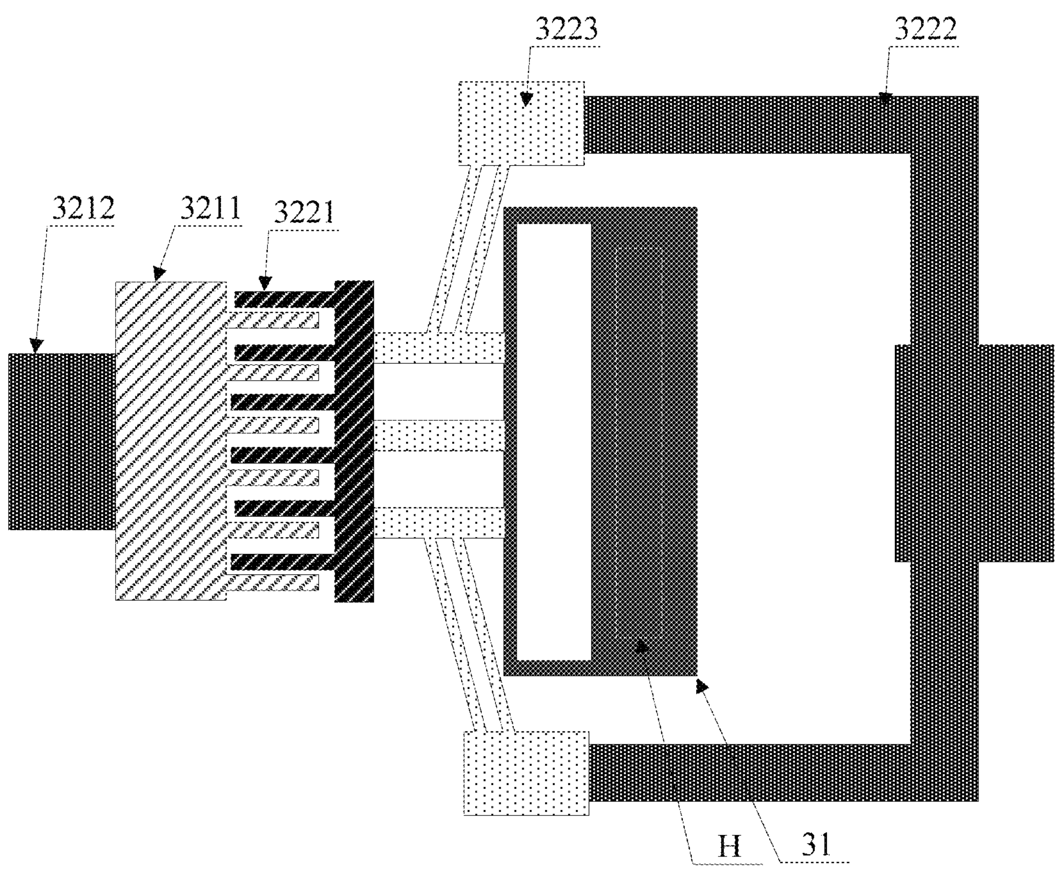
FIG. 7 is a schematic diagram of a state where a baffle is driven by a micro-mechanical driver according to an embodiment of the present disclosure.

As shown in FIG. 5, the stator comb teeth 3211 and the rotor comb teeth 3221 are disposed opposite to each other, and are in staggered fit with each other, and thus, may be engaged with each other. When the baffle 31 is located at the initial position, the signals received by the rotor electrode 3222 and the stator electrode 3212 have the same potential, or a potential difference between the signals received by the rotor electrode 3222 and the stator electrode 3212 is small (e.g., smaller than a set threshold), and thus, the signals received by the rotor electrode 3222 and the stator electrode 3212 may be approximately regarded as having the same potential. At this time, the electrostatic force for driving the rotor comb teeth 3221 to move is not generated between the rotor comb teeth 3221 and the stator comb teeth 3211, and the elastic connection structure 3223 connecting the rotor electrode 3222 and the rotor comb teeth 3221 is in a free state (as shown in FIG. 5); when the potential difference between the signals applied to the rotor electrode 3222 and the stator electrode 3212 is greater than the set threshold, the electrostatic force for driving the rotor comb teeth 3221 to move is generated between the stator comb teeth 3211 and the rotor comb teeth 3221, and the elastic connection structure 3223 connecting the rotor electrode 3222 and the rotor comb teeth 3221 is deformed, so that the rotor comb teeth 3221 drives the baffle 31 to move toward the stator comb teeth 3211, and the rotor comb teeth 3221 are deeply engaged with the stator comb teeth 3211. FIG. 7 is a schematic diagram of a state where a baffle is driven by a micro-mechanical driver according to an embodiment of the present disclosure. Generally, the greater the potential difference between the stator electrode 3212 and the rotor electrode 3222 is, the greater the generated electrostatic force is, the stronger the load capacity of the rotor comb teeth 3221 may be, and the greater the corresponding mass of the driven baffle 31 may be.

Figure 8:
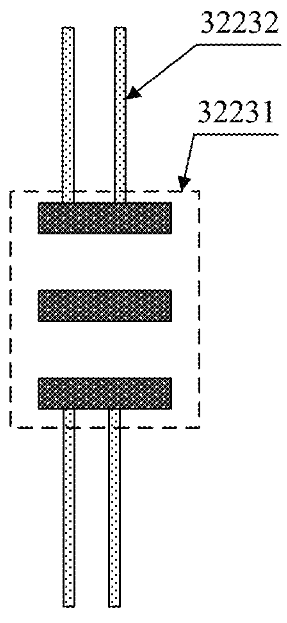
FIG. 8 is a schematic diagram of a structure of an elastic connection structure according to an embodiment of the present disclosure.

FIG. 8 is a schematic diagram of a structure of an elastic connection structure according to an embodiment of the present disclosure.

The elastic connection structure 3223 includes:

A connection member 32231 connected between the rotor comb teeth 3221 and the baffle 31; the connection member 32231 includes at least one connection block. FIG. 8 shows that the connection member 32231 includes three connection blocks. The connection member 32231 is provided to include a plurality of connection blocks, which can reduce a width of each connection block, can enhance the connection stability of the rotor comb teeth 3221 and the baffle 31. Because the connection blocks are to move, the connection blocks are required to be suspended in the manufacturing process. If the width of each connection block is too great, it is difficult to remove layers under the connection blocks, which is unfavorable for suspending the connection blocks. Therefore, the connection member 32231 is provided to include the plurality of connection blocks each with a less width, which can improve the connection stability and is easy to form.

Two sets of springs 32232 located on two opposite sides of the connection member 32231, one end of each spring 32232 is connected to one side of the connection member 32231, and the other end is connected to the rotor electrode 3222. The other end of each spring 32232 may be directly connected to the rotor electrode 3222, as shown in FIG. 6. The springs 32232 on the same side of the elastic connection member 32231 form a set of springs, and each set of springs 32232 includes at least one spring 32232.

Figure 9:
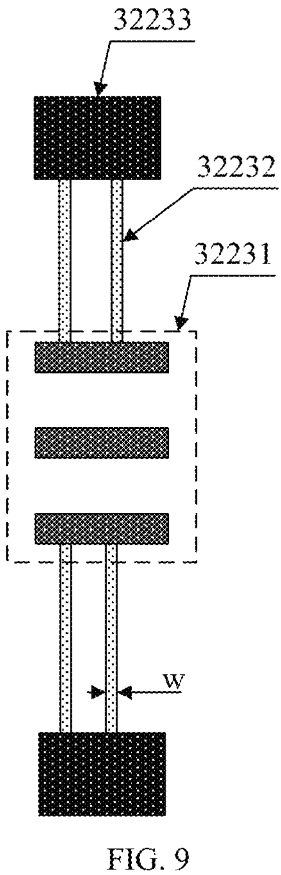
FIG. 9 is a schematic diagram of a structure of an elastic connection structure according to an embodiment of the present disclosure.

In some embodiments, the other end of each spring 32232 may further be indirectly connected to the rotor electrode 3222. Referring to FIG. 9, FIG. 9 is a schematic diagram of another structure of an elastic connection structure 3223 according to an embodiment of the present disclosure. The elastic connection structure 3223 further includes: two spring anchor blocks 32233 positioned on two sides of the two set of springs 32232 away from the connection member 32231, respectively, wherein each spring anchor block 32233 is fixed at one end of the rotor electrode 3222 and directly connected to the other end of the corresponding spring 32232.

In some embodiments, a thickness of each spring 32232 is at least 0.2 times a width w of the spring 32232. For example, the width w of the spring 32232 is greater than the thickness d of the spring 32232. The width of the spring 32232 is at least 0.2 times the thickness of the spring 32232, so that the tension of the spring 32232 may be increased, thereby facilitating the deformation of the spring 32232.

In other embodiments, the thickness of the spring 32232 may be set to be at least one time greater than the width w of the spring 32232, which may allow the spring 32232 to have greater tension.

Figure 10:
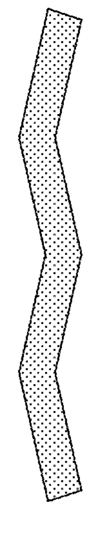
FIG. 10 is a schematic diagram of a pattern of a spring according to an embodiment of the present disclosure.

In other embodiments, the springs 32232 include straight-line springs 32232, as shown in FIG. 8. The springs 32232 may alternatively be zigzag springs 32232, as shown in FIG. 10, which is a schematic diagram of a shape of a spring 32232 according to an embodiment of the present disclosure.

Figure 11:
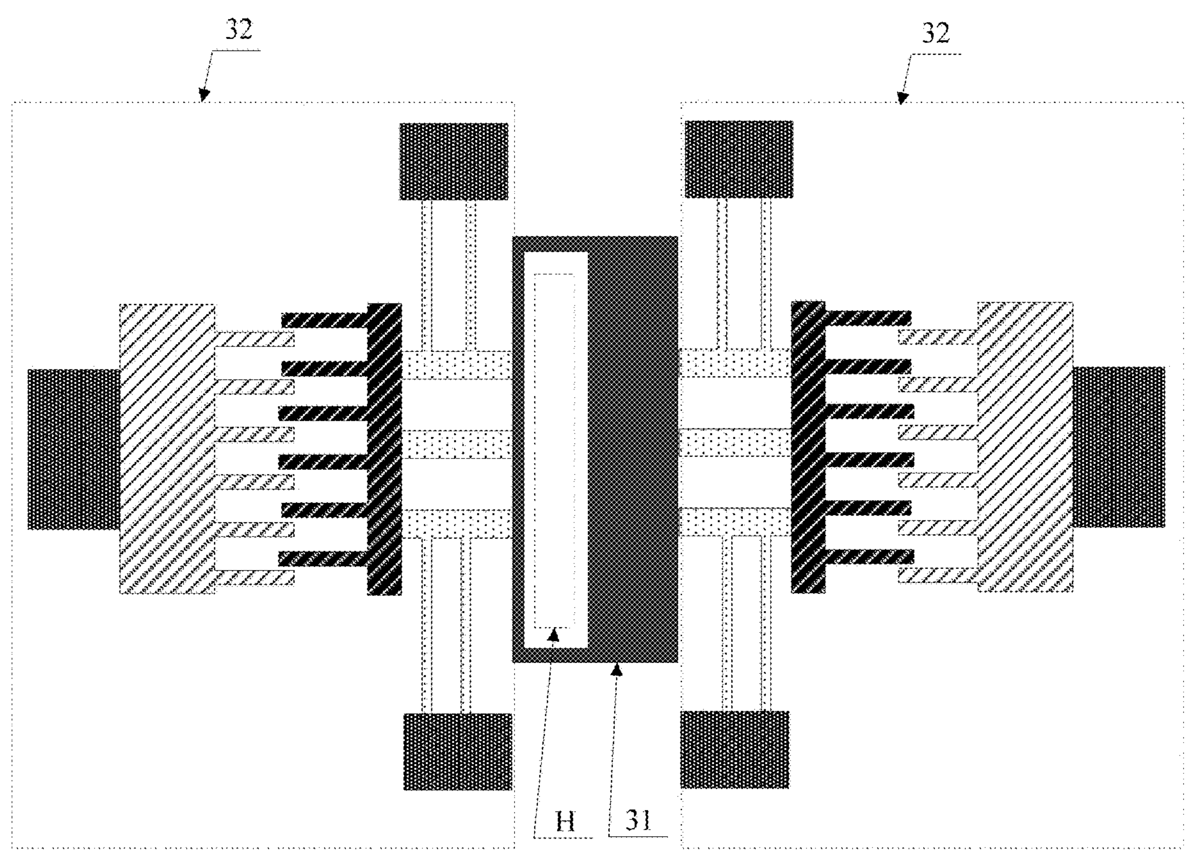
FIG. 11 is a schematic diagram of a structure of a phase control structure according to an embodiment of the present disclosure.

FIG. 11 is a schematic diagram of another structure of a phase control structure according to an embodiment of the present disclosure.

The phase control structure 3 includes two micro-mechanical drivers 32 located on two opposite sides of the baffle 31 and connected to the baffle 31.

The two micro-mechanical drivers 32 are symmetrically distributed on two opposite sides of the baffle 31 in a moving direction of the baffle 31. The two micro-mechanical drivers 32 may be connected to different signal lines, so that when one of the micro-mechanical drivers 32 is damaged, the other micro-mechanical driver 32 may be activated, thereby improving the reliability of the phase control structure 3.

In other embodiments, the two micro-mechanical drivers 32 may use the same control signal, that is, the stators 321 in the two micro-mechanical drivers 32 are connected to the same signal line and the rotors 322 in the two micro-mechanical drivers 32 are connected to the other same signal line, so that the two micro-mechanical drivers 32 may be used to drive the baffle 31 at the same time, thereby improving the driving capability of the phase control structure 3.

As shown in FIG. 11, when the phase control structure 3 includes the two micro-mechanical drivers 32, the rotor electrode 3222 and the rotor comb teeth 3221 of each micro-mechanical driver 32 are located on the same side of the baffle 31, which facilitates the arrangement of the micro-mechanical drivers 32 on two opposite sides of the baffle 31.

In some embodiments, a material used for the phase control structure 3 includes: a semiconductor material, or a metal material.

For example, the material used for the phase control structure 3 may be selected to be a low-resistance semiconductor material, such as silicon; or a metal such as copper, aluminum, molybdenum, or gold, or the like; or various materials such as metal-inorganic material-metal. The material used for the phase control structure 3 may be preferably selected to be the metal.

Figure 12:
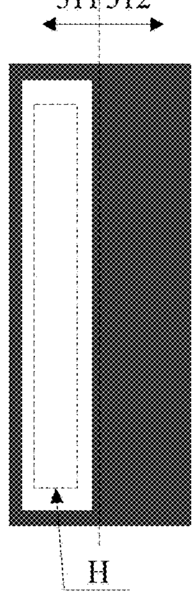
FIG. 12 is a schematic diagram of a structure of a baffle according to an embodiment of the present disclosure.

FIG. 12 is a schematic diagram of a structure of a baffle according to an embodiment of the present disclosure. Referring to FIG. 12, the baffle 31 includes:

A hollow-out groove 311; when the baffle 31 is located at the initial position, an orthographic projection of the hollow-out groove 311 on the substrate 1 completely covers an orthographic projection of the corresponding opening H on the substrate 1;

A shielding structure 312 capable of effectively shielding the corresponding opening H, wherein the shielding structure 312 and the hollow-out groove 311 are arranged side by side in the moving direction of the baffle 31.

As shown in FIG. 12, the hollow-out groove 311 (in a white rectangular region, including a portion inside the dashed line frame) is on the left side of the linear dotted line, the dashed line frame indicates a position corresponding to the opening H in the metal layer 2; the shielding structure 312 is on the right side of the linear dotted line, and a size (a length and width) of each of the hollow-out groove 311 and the shielding structure 312 is greater than that of the corresponding opening H.

When the microwave is required to be emitted from the opening H, the orthographic projection of the hollow-out groove 311 on the substrate 1 completely covers the orthographic projection of the corresponding opening H on the substrate 1, and the baffle 31 is located at the initial position; when the microwave is not required to be emitted from the opening H, an orthographic projection of the shielding structure 312 on the substrate 1 completely covers the orthographic projection of the corresponding opening H on the substrate 1, and the baffle 31 is driven by the micro-mechanical driver 32 to the position for shielding the opening H.

Figures 13, 14:
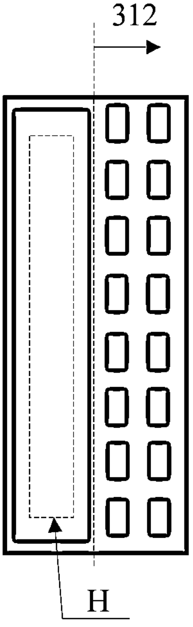
FIG. 13 is a schematic diagram of a structure of a baffle according to an embodiment of the present disclosure.
FIGS. 14 to 17 are schematic diagrams of other structures of a baffle according to an embodiment of the present disclosure.

Referring to FIG. 13, FIG. 13 is a schematic diagram of another structure of a baffle according to an embodiment of the present disclosure. The shielding structure 312 of the baffle 31 includes:

A hollow-out structure; when the hollow-out structure shields the opening H, an effective size of the shielded opening H is smaller than the half wavelength of the microwave passing through the opening H.

As shown in FIG. 13, the shielding structure 312 includes a plurality of hollow-out holes therein, and a pattern of an orthographic projection of each hollow-out hole on the substrate 1 may be a rectangle as shown in FIG. 13, or may be a square, a circle, or the like.

By using the hollow-out structure for the baffle 31, a weight of the baffle 31 can be reduced, so that the micro-mechanical driver 32 can easily drive the baffle 31, and the baffle 31 in a suspended state can be conveniently formed.

FIGS. 14 to 17 are schematic diagrams of other structures of a baffle according to an embodiment of the present disclosure.

The hollow-out structure includes: a comb-tooth structure, or a mesh structure.

The comb-tooth structure includes at least one comb tooth, and an extending direction of the comb tooth is the same as or intersects with the moving direction of the baffle 31.

Figure 15:
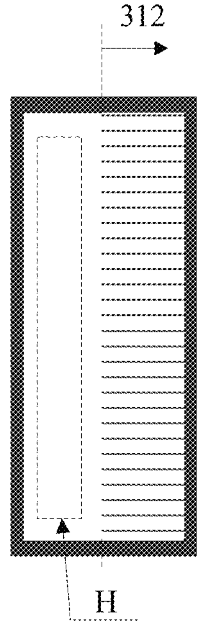
Figure 16:
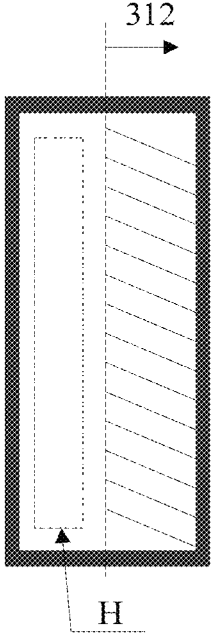

The hollow-out structure used for the shielding structure 312 in the baffle 31 may be a comb-tooth structure with coarse comb teeth as shown in FIG. 14, or with fine comb teeth as shown in FIG. 15. An extending direction of each of the comb teeth in FIGS. 14 and 15 is the same as the moving direction of the baffle 31. The hollow-out structure used for the shielding structure 312 in the baffle 31 may be a comb-tooth structure as shown in FIG. 16 in which the extending direction of each of the comb teeth intersects with the moving direction of the baffle 31 but is not perpendicular to the moving direction of the baffle 31. These comb teeth may be parallel to each other, and when the shielding structure 312 shields the opening, an orthographic projection of at least one comb tooth of the shielding structure 312 on the substrate 1 extends through the orthographic projection of the corresponding opening H on the substrate 1, which reduces the effective size of the opening, so that the microwave cannot pass through the shielding structure 312 and thus, the microwave is prevented from passing through.

Figure 17:
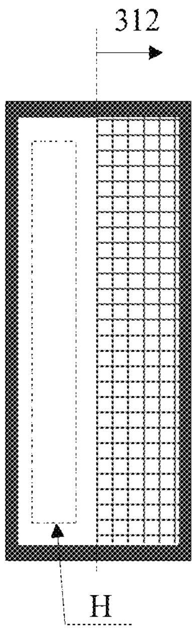

The hollow-out structure used for the shielding structure 312 in the baffle 31 may alternatively be a mesh structure as shown in FIG. 17.

The hollow-out structure used for the shielding structure 312 in the baffle 31 can reduce the effective size of the shielded opening H, so that the microwave cannot pass through the hollow-out holes of the hollow-out structure, and the purpose of effectively preventing the microwave from passing through is achieved.

FIGS. 18 to 21 are schematic diagrams of other structures of a baffle according to an embodiment of the present disclosure.

An outer contour of the shielding structure 312 in the baffle 31 is smaller than that of the opening H.

Figure 18:
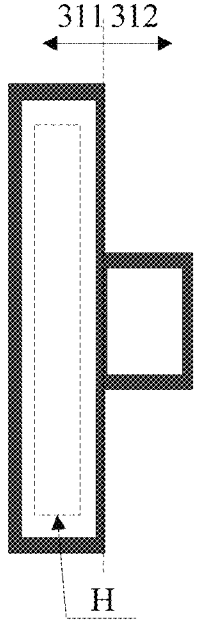
FIGS. 18 to 21 are schematic diagrams of other structures of a baffle according to an embodiment of the present disclosure.

As shown in FIG. 18, the shielding structure may be a hollow shielding structure with the outer contour smaller than that of the opening, which is beneficial to effectively reducing the effective size of the shielded opening H, thereby preventing the microwave from passing through.

Figure 19:
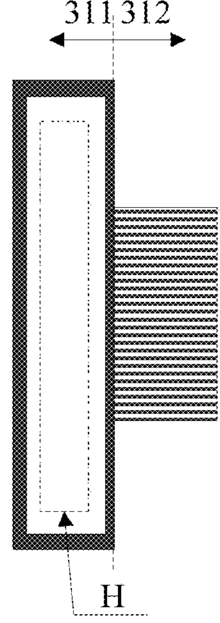
Figure 20:
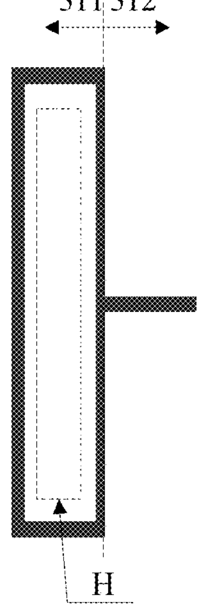
Figure 21:
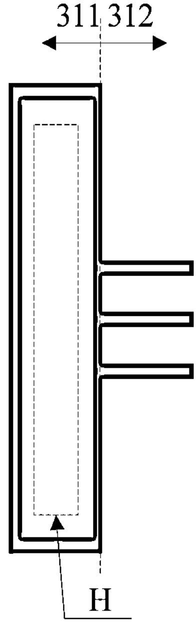

The shielding structure 312 having the outer contour smaller than that of the opening H may also adopt the above hollow-out structure design, as shown in FIGS. 19 to 21.

Figure 22:
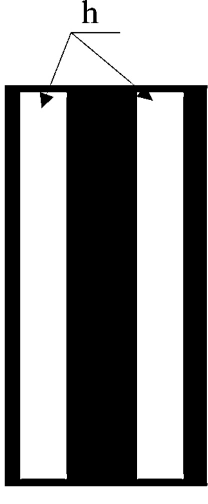
FIG. 22 is a schematic diagram of a structure of an opening in a metal layer according to an embodiment of the present disclosure.

FIG. 22 is a schematic diagram of a structure of an opening in a metal layer according to an embodiment of the present disclosure.

Any one of the openings H in the metal layer 2 includes a plurality of sub-openings h arranged along the moving direction of the baffle 31.

The opening H may include two sub-openings h (as shown in FIG. 22), which are arranged side by side in the moving direction of the baffle 31. The opening H may alternatively include three or more sub-openings H, which are not illustrated.

The opening H includes the plurality of sub-openings h arranged side by side in the moving direction of the baffle 31, so that a moving distance of the corresponding baffle 31 in the moving direction can be reduced, and the response speed of the baffle 31 can be improved.

Figure 23:
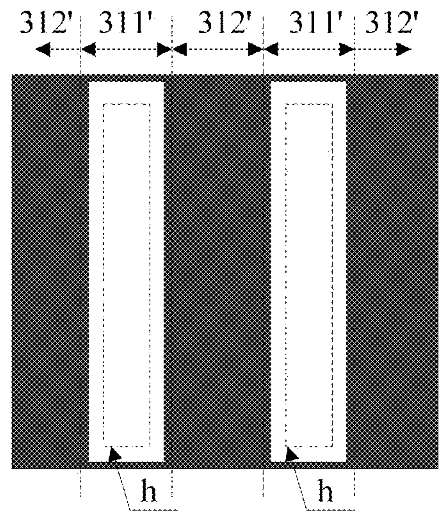
FIGS. 23 to 25 are schematic diagrams of other structures of a baffle according to an embodiment of the present disclosure.
Figure 24:
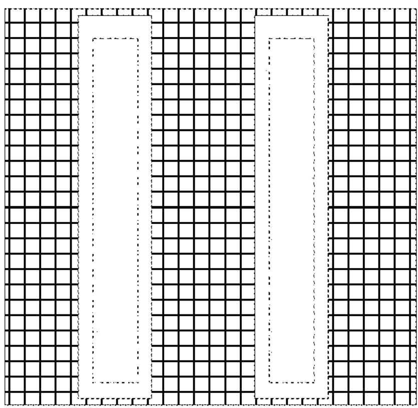
Figure 25:
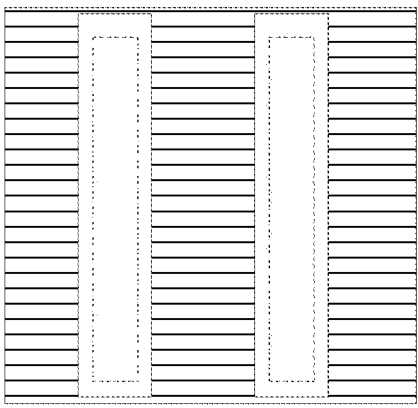

In the case where the opening H includes the plurality of sub-openings h, the corresponding modifications to the baffle 31 are as follows:

FIGS. 23 to 25 are schematic diagrams of other structures of a baffle according to an embodiment of the present disclosure. Referring to FIGS. 23 to 25, the hollow-out groove 311 in the baffle 31 includes a plurality of hollow-out sub-grooves 311' in one-to-one correspondence with the plurality of sub-openings h;

The shielding structure 312 includes a plurality of shielding sub-structures 312', and every two adjacent shielding sub-structures 312' are disposed on two opposite sides of one hollow-out sub-groove 311. The shielding structure 312 may also adopt the hollow-out structure, such as the mesh structure (as shown in FIG. 24) and the comb-tooth structure (as shown in FIG. 25). Alternatively, other designs of the shielding structure 312 may also be adopted, which is not illustrated here.

The hollow-out groove 311 in the baffle 31 includes the plurality of hollow-out sub-grooves 311' in one-to-one correspondence with the plurality of sub-openings h, the shielding structure 312 includes the plurality of shielding sub-structures 312' and every two adjacent shielding sub-structures 312' are disposed on two opposite sides of one hollow-out sub-groove 311, so that it can be controlled whether to allow the microwave to pass through in coordination with the opening H including the plurality of sub-openings h.

In the embodiment provided by the present disclosure, the phase control structure 3 and the baffle 31 are disposed in the same layer, and are made of the same material, such as a metal material.

Figure 26:
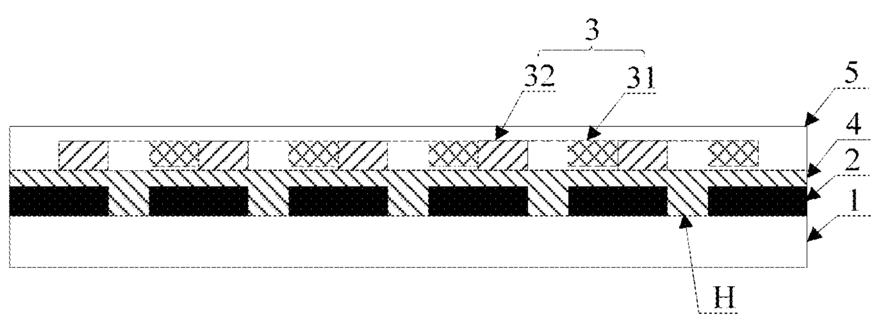
FIG. 26 is a schematic diagram of another structure of a metasurface device according to an embodiment of the present disclosure.

FIG. 26 is a schematic diagram of another structure of a metasurface device according to an embodiment of the present disclosure.

The metasurface device further includes an insulating layer located between the metal layer 2 and a layer where the plurality of phase control structures 3 are located.

By providing the insulating layer between the metal layer 2 and the layer where the plurality of phase control structures 3 are located, the electrical conduction between the metal layer 2 and the layer where the plurality of phase control structures 3 are located can be prevented.

In some embodiments, a material of the insulating layer includes at least one inorganic material, such as silicon nitride, silicon oxynitride, silicon oxide, or a stack of layers, and a thickness of the insulating layer may be in a range of 20 um to 500 um.

A protective layer 5 is further provided on a side of the phase control structures 3 away from the substrate 1 for protecting the phase control structures 3.

Figure 27:
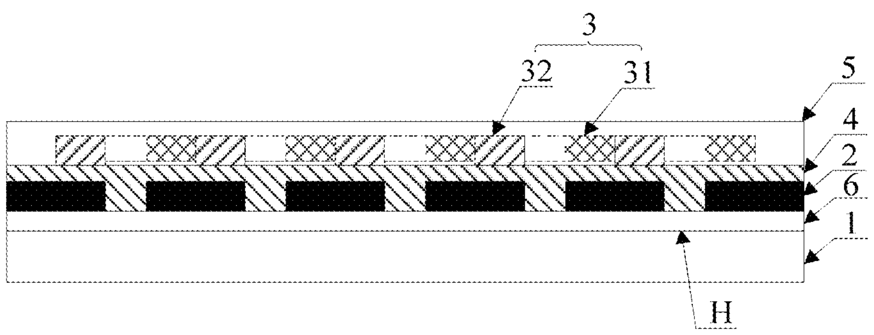
FIG. 27 is a schematic diagram of another structure of a metasurface device according to an embodiment of the present disclosure.

FIG. 27 is a schematic diagram of another structure of a metasurface device according to an embodiment of the present disclosure.

The metasurface device further includes a transition layer 6 positioned between the substrate 1 and the metal layer 2, and the transition layer 6 is used for increasing the adhesion of the metal layer 2.

A material used for the transition layer 6 may be silicon nitride, silicon oxynitride, or the like.

Figure 28:
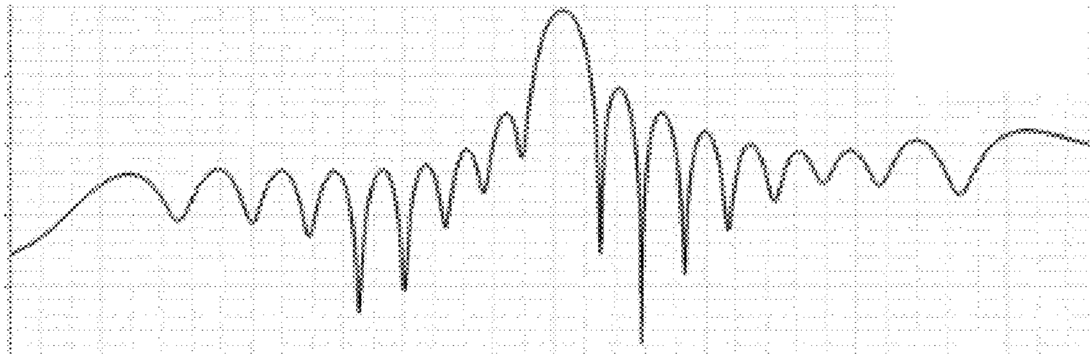
FIGS. 28 to 30 are far-field radiation patterns for a holographic antenna according to an embodiment of the present disclosure.
Figure 29:
Figure 30:
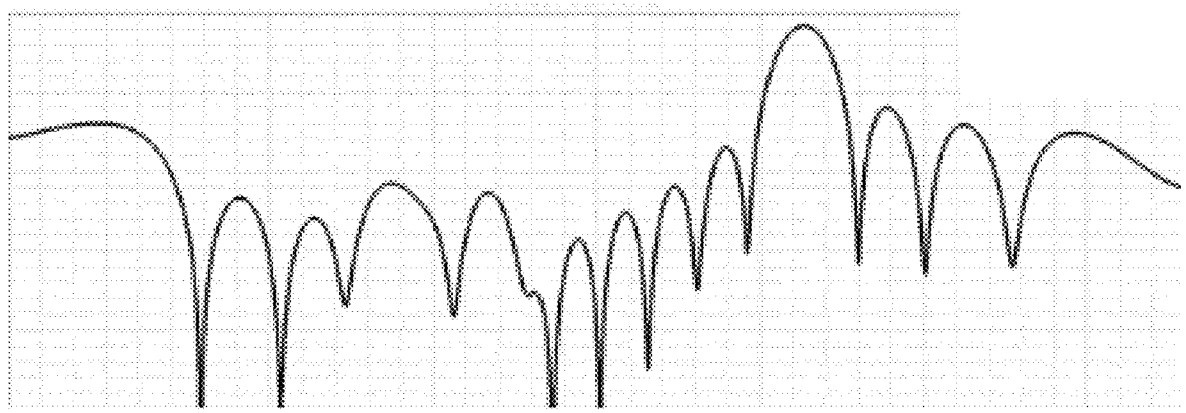

FIGS. 28 to 30 are far-field radiation patterns for a holographic antenna according to an embodiment of the present disclosure.

FIGS. 28 to 30 are schematic diagrams of beams emitted by a holographic antenna including the metasurface device according to the embodiment of the present disclosure. By controlling the phase control structure 3 corresponding to each opening H of the metasurface device according to the present disclosure, whether to allow the microwave to pass through the opening H can be controlled, so that the far-field of the antenna can be changed, and the intensity and the direction of the beam can be accordingly changed, thereby implementing the reconfigurable function of the holographic antenna.

Figure 31:
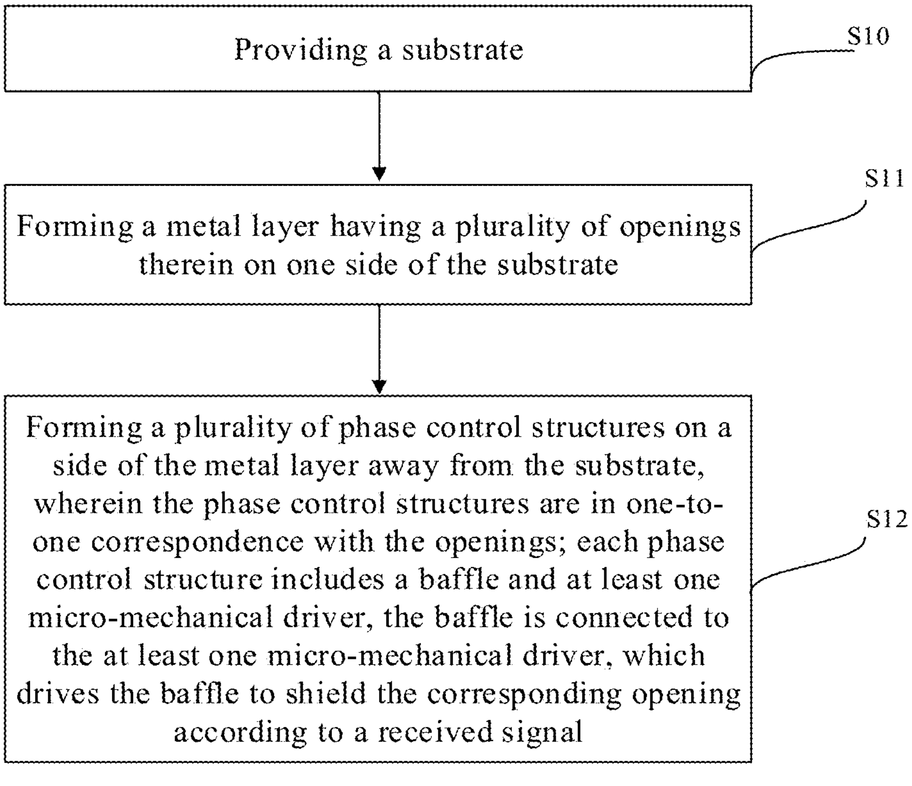
FIG. 31 is a flow chart illustrating a method for manufacturing a metasurface device according to an embodiment of the present disclosure.

Based on the same inventive concept, an embodiment of the present disclosure provides a method for manufacturing a metasurface device. FIG. 31 is a flow chart illustrating a method for manufacturing a metasurface device according to an embodiment of the present disclosure. Referring to FIG. 31, the method includes:

Step S10: providing a substrate;

Step S11: forming a metal layer having a plurality of openings therein on one side of the substrate;

Step S12: forming a plurality of phase control structures on a side of the metal layer away from the substrate such that the phase control structures are in one-to-one correspondence with the openings; each phase control structure includes a baffle and at least one micro-mechanical driver, the baffle is connected to the micro-mechanical driver, and the micro-mechanical driver drives the baffle to shield the corresponding opening according to a received shielding signal.

Materials, thickness ranges of the substrate and the metal layer and structural forms of the openings, and components of the phase control structures may be referred to in the above description of the metasurface device, and are not described in detail herein.

In some embodiments, the forming the metal layer having the plurality of openings therein on one side of the substrate may include:

Forming a transition layer on one side of the substrate; the transition layer is used for increasing the adhesion of the metal layer;

Forming an original metal layer on a side of the transition layer away from the substrate by sputtering; the original metal layer is made of the same material and has the same thickness as the metal layer.

Forming the plurality of openings in the original metal layer to obtain the metal layer with the plurality of openings.

The forming the plurality of openings in the original metal layer to obtain the metal layer with the plurality of openings may be achieved by the following two modes:

The first mode is as follows: patterning the original metal layer to obtain the metal layer with the plurality of openings.

For example, a mask having a plurality of fully exposed holes is covered on the original metal layer, and the original metal layer covered with the mask is exposed and developed to produce the metal layer having the plurality of openings.

The second mode is as follows: patterning the original metal layer to form a seed layer with the plurality of openings; and electroplating and thickening the seed layer with the plurality of openings to obtain the metal layer with the plurality of openings.

The seed layer is formed in the same manner as in the first mode, and the thicker metal layer having the plurality of openings may be obtained by electroplating and thickening the seed layer having the plurality of openings so that a metal is grown on the seed layer.

The seed layer with the plurality of openings is formed by patterning the original metal layer; and the seed layer with the plurality of openings is electroplated and thickened to obtain the metal layer with the plurality of openings, so that the thicker metal layer may be formed.

In some embodiments, before the forming the plurality of phase control structures on a side of the metal layer away from the substrate, the method further includes:

Forming an insulating layer on a side of the metal layer away from the substrate; forming a sacrificial layer on one side of the insulating layer; the sacrificial layer is used to suspend a portion of the phase control structure that is to move.

A material of the sacrificial layer may be any one of organic photoresist, inorganic silicon nitride, silicon oxynitride, silicon oxide, and the like, is different from that of the insulating layer. A thickness of the sacrificial layer may be in a range from 0.2 um to 5 um.

The sacrificial layer is provided between the insulating layer and the layer where the phase control structures are located, so that the moving portion of each phase control structure is suspended by removing the material of the sacrificial layer in an orthographic projection region of the moving portion of the phase control structure in the sacrificial layer after the phase control structures are formed, and thus, the phase control structures possesses a basic condition that drives the baffle to move.

In some embodiments, the forming the plurality of phase control structures on a side of the metal layer away from the substrate may include:

Forming a low-impedance conductive layer (a conductive layer with a low impedance) on a side of the sacrificial layer away from the substrate; patterning the conductive layer to form the micro-mechanical driver and the baffle of each phase control structure; the micro-mechanical driver includes a stator fixed on one side of the corresponding opening and a rotor arranged opposite to the stator, one end of the rotor is fit with the stator, and the other end is connected to the corresponding baffle; and removing the sacrificial layer to obtain the plurality of phase control structures.

The materials and thickness ranges of the conductive layer may be referred to the description in the above metasurface device, and are not described herein again.

The low-impedance conductive layer is formed on the sacrificial layer, and is patterned, to form the micro-mechanical driver and the baffle, so that the phase control structures may be formed through one-time patterning process, and the process is saved.

In some embodiments, before forming the sacrificial layer, the method further includes:

Forming a lead layer on a side of the insulating layer away from the substrate such that the lead layer includes a plurality of leads connected to the micro-mechanical drivers.

The lead layer includes the leads respectively connected to the stator and the rotor in each of the micro-mechanical drivers for supplying signals of different potentials to the stator and the rotor. When each phase control structure includes two micro-mechanical drivers, the stators of the two micro-mechanical drivers may be connected to different signal lines, or the same signal line; correspondingly, the rotors of the two micro-mechanical drivers may be connected to different signal lines, or the same signal line.

Figure 32:
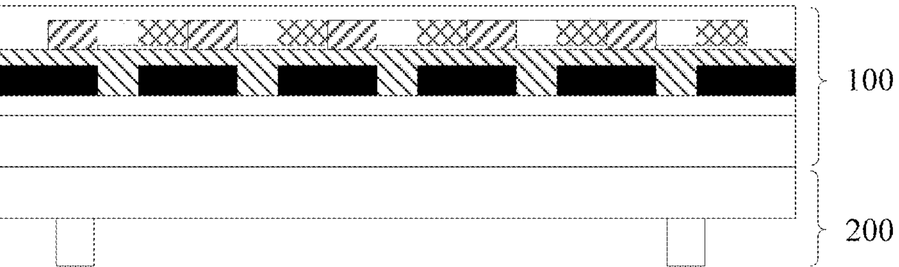
FIG. 32 is a schematic diagram of a structure of an antenna according to an embodiment of the present disclosure.

Based on the same inventive concept, an embodiment of the present disclosure provides an antenna. FIG. 32 is a schematic diagram of a structure of an antenna according to an embodiment of the present disclosure. Referring to FIG. 32, the holographic antenna includes:

The metasurface device 100 as described above; for a detailed implementation of the metasurface device 100, reference may be made to the description of the related embodiments, and details are not repeated herein.

A feeding unit 200 located on one side of the metasurface device 100, for providing microwaves to the metasurface device 100.

Based on the same inventive concept, embodiments of the present disclosure provide a communication device, which includes the antenna as described above.

The communication device may be a mobile communication device such as a mobile phone, a tablet computer, or a handheld device or the like, or may alternatively be a communication device at a fixed location such as a micro base station, a femto base station, or a wireless access point.

While preferred embodiments of the present disclosure have been described, additional variations and modifications in these embodiments may occur to one of ordinary skill in the art once they learn of the basic inventive concepts. Therefore, it is intended that the appended claims are interpreted as including the preferred embodiments and all variations and modifications that fall within the scope of the present disclosure.

It will be apparent to one of ordinary skill in the art that various changes and modifications may be made in the present disclosure without departing from the spirit and scope of the present disclosure. Thus, if these modifications and variations of the present disclosure fall within the scope of the claims of the present disclosure and their equivalents, the present disclosure is also intended to include such modifications and variations.

What is claimed is:

1. A metasurface device, comprising:

a substrate, and a metal layer on the substrate and having a plurality of openings therein; and a plurality of phase control structures on a side of the metal layer away from the substrate, and in one-to-one correspondence with the plurality of openings; and wherein each of the plurality of phase control structures comprises a baffle and at least one micro-mechanical driver, the baffle is connected to the at least one micro-mechanical driver, which is configured to actuate the baffle to shield a corresponding opening in response to a received signal;

wherein the at least one micro-mechanical driver each comprises:

a stator fixed at one side of the corresponding opening; and a rotor opposite to the stator, wherein one end of the rotor is fit with the stator, and the other end of the rotor is connected to the baffle; and wherein the stator comprises:

stator comb teeth; and a stator electrode connected to the stator comb teeth; and wherein the rotor comprises:

rotor comb teeth opposite to the stator comb teeth, wherein the rotor comb teeth are in staggered fit with the stator comb teeth, and one end of the rotor comb teeth away from the stator comb teeth is connected to the baffle;

a rotor electrode; and an elastic connection structure connected between the rotor comb teeth and the rotor electrode, wherein the rotor electrode and the stator electrode are configured to generate an electrostatic force between the stator comb teeth and the rotor comb teeth after signals are applied to the rotor electrode and the stator electrode, and by the electrostatic force the rotor comb teeth are driven to drive the baffle to move toward the stator comb teeth.

2. The metasurface device of claim 1, wherein the elastic connection structure comprises:

a connection member connected between the rotor comb teeth and the baffle; and two sets of springs on two opposite sides of the connection member, wherein one end of each spring is connected to one side of the connection member, and the other end of the spring is connected to the rotor electrode; and the elastic connection structure further comprises:

two spring anchor blocks on two sides of the two set of springs away from the connection member, respectively, wherein each spring anchor block is fixed at one end of the rotor electrode and directly connected to the other end of the spring.

3. The metasurface device of claim 2, wherein the spring comprises:

a straight-line spring, or a zigzag spring.

4. The metasurface device of claim 1, wherein the rotor electrode half surrounds the baffle, and the rotor comb teeth are on a side of the baffle not surrounded by the rotor electrode.

5. The metasurface device of claim 1, wherein the phase control structure comprises two micro-mechanical drivers on two opposite sides of the baffle and connected to the baffle; and the rotor electrode and the rotor comb teeth of each micro-mechanical driver are on a same side of the baffle.

6. An antenna, comprising:

the metasurface device of claim 1; and a feeding unit on one side of the metasurface device, for providing a microwave to the metasurface device.

7. A communication device, comprising the antenna of claim 6.

8. A metasurface device, comprising:

a substrate, and a metal layer on the substrate and having a plurality of openings therein; and a plurality of phase control structures on a side of the metal layer away from the substrate, and in one-to-one correspondence with the plurality of openings; and wherein each of the plurality of phase control structures comprises a baffle and at least one micro-mechanical driver, the baffle is connected to the at least one micro-mechanical driver, which is configured to actuate the baffle to shield a corresponding opening in response to a received signal, wherein the baffle comprises:

a hollow-out groove; wherein when the baffle is located at an initial position, an orthographic projection of the hollow-out groove on the substrate completely covers an orthographic projection of the corresponding opening on the substrate; and a shielding structure capable of effectively shielding the corresponding opening, wherein the shielding structure and the hollow-out groove are arranged side by side in a moving direction of the baffle.

9. The metasurface device of claim 8, wherein the shielding structure comprises:

a hollow-out structure; wherein when the hollow-out structure shields the opening, an effective size of the shielded opening is smaller than a half wavelength of the microwave passing through the opening.

10. The metasurface device of claim 9, wherein the hollow-out structure comprises:

a comb-tooth structure, or a mesh structure.

11. The metasurface device of claim 10, wherein the comb-tooth structure comprises:

at least one comb tooth, wherein an extending direction of the at least one comb tooth is identical to the moving direction of the baffle or intersects with the moving direction of the baffle.

12. The metasurface device of claim 8, wherein an outer contour of the shielding structure is smaller than an outer contour of the corresponding opening.

13. The metasurface device of claim 8, wherein each opening comprises a plurality of sub-openings arranged along the moving direction of the baffle.

14. The metasurface device of claim 12, wherein the hollow-out groove comprises a plurality of hollow-out sub-grooves in one-to-one correspondence with the plurality of sub-openings; and the shielding structure comprises a plurality of shielding sub-structures, and every two adjacent shielding sub-structures are on two opposite sides of one hollow-out sub-groove.

15. A method for manufacturing a metasurface device, comprising:

providing a substrate;

forming a metal layer having a plurality of openings therein on one side of the substrate; and forming a plurality of phase control structures on a side of the metal layer away from the substrate, wherein the plurality of phase control structures are in one-to-one correspondence with the plurality of openings; each of the plurality of phase control structures comprises a baffle and at least one micro-mechanical driver, the baffle is connected to the at least one micro-mechanical driver, which drives the baffle to shield a corresponding opening based on a received shielding signal;

wherein the forming the metal layer having the plurality of openings therein on one side of the substrate comprises:

forming a transition layer on one side of the substrate to increase adhesion of the metal layer;

forming an original metal layer on a side of the transition layer away from the substrate by sputtering; and forming the plurality of openings in the original metal layer to obtain the metal layer with the plurality of openings.

16. The method of claim 15, wherein the forming the plurality of openings in the original metal layer to obtain the metal layer with the plurality of openings, comprises:

patterning the original metal layer to form a seed layer with multiple openings; and thickening the seed layer with multiple openings by electroplating to obtain the metal layer with the plurality of openings.

17. The method of claim 15, wherein before the forming the plurality of phase control structures on the side of the metal layer away from the substrate, the method further comprises:

forming an insulating layer on a side of the metal layer away from the substrate; and forming a sacrificial layer on one side of the insulating layer; wherein the sacrificial layer is used to suspend a portion of each of the plurality of phase control structures that is to move;

wherein the insulating layer and the sacrificial layer are made of different materials; and the forming the plurality of phase control structures on the side of the metal layer away from the substrate comprises:

forming a low-impedance conductive layer on a side of the sacrificial layer away from the substrate;

patterning the conductive layer to form the at least one micro-mechanical driver and the baffle of each of the plurality of phase control structures; wherein each of the at least one micro-mechanical driver comprises a stator fixed on one side of the corresponding opening and a rotor arranged opposite to the stator, one end of the rotor is fit with the stator, and the other end of the rotor is connected to the baffle; and removing the sacrificial layer to obtain the plurality of phase control structures.

* * * * *